United States Patent Office.

JOHN JAMES BODMER, OF NEWPORT, ENGLAND.

*Letters Patent No.* 70,510, *dated November* 5, 1867; *reissue No.* 2,933, *dated May* 19, 1868.

IMPROVEMENT IN PREPARING CEMENTS FROM SLAGS.

The Schedule referred to in these Letters Patent and making part of the same.

TO ALL WHOM IT MAY CONCERN:

Be it known that I, JOHN JAMES BODMER, of Newport, England, have invented a new and improved Method of Preparing Cement from Slags; and I do hereby declare the following to be a correct description thereof, and do substitute the same for the imperfect specification of my said invention, accompanying the Letters Patent of the United States issued to me on the 5th day of November, 1867.

My invention consists, firstly, in a novel and improved method of reducing or converting the slag, cinder, or scoria from blast-furnaces, and other furnaces yielding or producing slag or cinder in a fluid, semi-fluid, or viscous state, into a lamellated or pulverulent state, or into sheets or scale.

One mode of carrying out my invention consists in causing the slag or cinder to run direct from the furnace upon a pair of rolls revolving at a surface-velocity corresponding more or less with the flow of the cinder or slag, and set closer to or further apart from each other, according to the object in view. The rolls may revolve at the same surface-velocity, whereby a simply laminating action is produced, or one roller may be made to revolve quicker than the other, whereby a grinding or tearing action is provided, in addition to the laminating action. Instead of using a pair of rolls, I also employ one roller acting against a fixed plane or curved surface. The slag or cinder issues from the above-described rolling or grinding-apparatus in the shape of scale, which is allowed to drop on to and to be conveyed away by a carrier-belt, water being allowed to flow upon the belt from a rose or perforated pipe; or, instead of a carrier-belt, a creeper or other apparatus may be employed for conveying the laminated cinder away, or a stationary box or cistern filled with water, may be placed under the rolls, the rolled cinder dropping on a carrier-belt which partly passes through the water in the cistern; or the rolled cinder may fall into trucks similar to those generally employed for receiving the flowing cinder from blast-furnaces. These trucks may be filled with water, which, as the cinder accumulates in the truck, will overflow. The rolls may be kept cool by allowing them to dip into water-tanks, or by causing water to flow upon them, or, finally, by passing cold water through them. The contact of the water with the hot cinder causes the latter to become very brittle, whereby its further reduction to sand or grit or powder, if desired, by rolling or grinding, is greatly facilitated.

I also roll or treat the cinder, as described, without allowing it to come in contact with water. For this object the scale may be made to drop from the first pair of rolls to a second pair, whereby the particles of scale will become sufficiently cooled to prevent their adhering together, or the scale issuing from the rolls may be cooled by an artificial current of air, whilst falling into a receiver upon a carrier-belt or other apparatus. Instead of treating the slag or cinder directly as it flows from the furnace in which it is first produced, I also remelt the various kinds of slag, cinder, or scoria, from tips or other accumulations, and then pass it through rolls or other apparatus, as described; and in like manner I heat broken or refuse glass, for the purpose of subsequently converting it into the condition of sand or grit, or into powder, to be used for sand-paper or other purposes. Cinder or slag from blast-furnaces (especially from grey iron) contain a large percentage of lime, which, as also the magnesia, is in combination with the silica. In the soil these silicates are decomposed by the carbonic or other acids which come in contact with them, and thus they are enabled to yield lime and magnesia, as well as silica, in a soluble state, to the growing plant. The only reason why cinder or slag have hitherto not been used for that purpose, was the cost of reducing them to powder, which difficulty is now completely overcome by the above-described process.

My invention consists, secondly, in applying the above-described process to the reducing or converting into a lamellated or pulverulent state, or into scale, those descriptions of cement, and of materials employed for producing cements, which admit, without becoming thereby deteriorated, of being heated to a fluid or semi-fluid state. When reduced to a pulverulent or lamellated state, the said materials are in a more favorable condition for undergoing further reduction by grinding, and for being mixed with each other, or with other materials.

My invention consists, thirdly, in the use of slag, cinder, or scoria from blast-furnaces, copper-smelting and other furnaces, for the manufacture of a certain class of cements, by mixing, amalgamating, and incorporating such slag, cinder, or scoria with lime, and without subjecting the mixed slag and lime to heat in kilns or furnaces. One description of this class of cements is produced by mixing and amalgamating the slag reduced to an impalpable powder, with slaked or hydrated lime, likewise in a fine powder, in such proportion as the nature of the slag and the lime employed, or the use to which the cement is to be applied, may render necessary. This cement may also be produced by using slag in a more or less subdivided state, for instance, like gravel or sand, or in the form of scale, and mixing with it, in the required proportion, the slaked or hydrated lime, and then passing this mixture or compound through grinding-apparatus, by which the two substances will be thoroughly incorporated, and formed into an impalpable powder. Another mode of preparing this cement is by mixing the slag with unslaked or fresh lime, in the required proportion, allowing the lime to slake whilst being mixed with the slag, cinder, or scoria, and by subsequently treating the same as described. To give an idea of the proportion in which the slag and lime can be used, I may say that seven parts, by weight, of slag, mixed and amalgamated with one part, by weight, of lime, form an excellent slow-setting cement, especially suitable for what is termed "rendering" walls for stucco-work, for making concrete, or for other purposes.

My invention consists, fourthly, in producing a cement which I call "concrete cement," and which is made of the same materials as the cement above described, with the difference that the lime is used in its caustic state, or unslaked. The manipulation in preparing this cement is precisely as above described. This class of cement is principally intended for forming concrete.

My invention consists, fifthly, in the manufacture and use of an artificial slag, to be mixed and incorporated with lime, as above named, instead of, or as a substitute for slag, cinder, or scoria. This artificial slag may be produced in different ways; for instance, I mix and melt together such proportions of silicious, argillaceous, or such silicious, argillaceous, or calcareous materials, (without the addition of slag, cinder, or scoria,) which, when subsequently amalgamated with either slaked or unslaked lime, as above described, will produce the desired cement, or concrete cement; or I take a certain quantity of slag, cinder, or scoria, and mix and melt the same together, with such proportions of silicious and argillaceous matter, with or without calcareous flux, as may be desirable, for producing the required combination, and which is afterwards incorporated with lime, in the manner described.

My invention consists, sixthly, in the manufacture of a cement, by mixing together slag, cinder, or scoria, whether artificial or from furnaces, with a certain proportion of lime or calcareous matter, and with or without alumina, this mixture or compound in a disintegrated state, or, after having been formed into lumps or bricks, is calcined or smelted, and subsequently ground.

Certain applications of the above-described cements, which are well adapted for all the various uses to which cements in general are applied, are especially valuable for the manufacture of artificial stone, either by themselves, or worked together with broken hard materials. In preparing the cement for such purposes, more or less water may be used in gauging or wetting the same, and for large pieces, as, for instance, for the production of grindstones, a more or less pasty mass may be preferred, which, without being rammed, will set or harden in the mould or moulds. The grain or texture of such stone will depend upon the description of admixture with which the cement is worked. For the manufacture of building-material, however, such as blocks or bricks, I prefer to proceed as follows: I thoroughly mix and amalgamate the cement, in the state of powder, with a small quantity of water, and the more carefully this operation is performed, the harder the stone will ultimately grow. I then add the desired quantity of coarsely-ground or broken material, the proportion of which again depends upon the desired quality of the article to be manufactured. For bricks, I take from one to two parts, by weight, of coarsely-ground blast-furnace slag, or slag from puddling or heating-furnaces, or from any other furnaces, or coarse sand, broken shingle, stone of any description, and other materials of a similar nature, to one part of cement. I then amalgamate the gauged cement with the coarse or gritty material, and when finished, the mixture will be, in dampness, about equal to ready-prepared moulding-sand for foundry purposes. It is then made into bricks by pressure, and these are exposed to the influences of the atmosphere immediately after leaving the press. The bricks should be kept moist or wet, and will, in about three weeks' time, attain the hardness of natural stone. The same mixtures are applicable to all descriptions of concrete-work or walling.

Having now described the nature of my said invention, and the manner in which the same may be carried into effect, I wish it to be understood that I do not claim nor restrict myself to the use of the particular apparatus hereinbefore described; but

What I claim as my invention, and desire to secure by Letters Patent, is—

1. The rolling, laminating, grinding, and otherwise reducing or converting to scale or sheets, or to a lamellated or to a pulverulent state or condition, the cinder, slag, or scoria obtained from blast-furnaces, copper-smelting and other furnaces, in a fluid or semi-fluid or pasty or viscous condition, in the manner and for the purposes substantially as described, and for other purposes.

2. The rolling, laminating, grinding, and otherwise reducing or converting to scale, or to a lamellated or to a pulverulent condition, of various descriptions of cement, and of materials from which cements are to be produced, substantially as described.

3. The application of slag, cinder, or scoria, whether artificially prepared for the purpose, or as obtained from blast-furnaces or other furnaces, in the manufacture of cement, and the several modes or processes employed in the preparation of cements, substantially as described.

4. The manufacture of artificial stone from the above-described cements, either by themselves, or with the admixture of coarsely-ground materials, such as furnace-slags, scoria, any descriptions of hard stones, or of shingle, sand, or other materials of a similar nature.

JOHN JAMES BODMER. [L. S.]

Witnesses:

WM. ROBERT LAKE,

THOS. N. PALMER.